United States Patent [19]
Stanchus

[11] Patent Number: 5,809,352
[45] Date of Patent: Sep. 15, 1998

[54] PHOTOGRAPHIC CAMERA HAVING A DOUBLE EXPOSURE PROTECTION DEVICE COMBINED WITH A FILM CARTRIDGE INDICATOR

[75] Inventor: Robert J. Stanchus, Rochester, N.Y.

[73] Assignee: Eastman Kodak Company, Rochester, N.Y.

[21] Appl. No.: 957,797

[22] Filed: Oct. 24, 1997

[51] Int. Cl.[6] .............................. G03B 17/18; G03B 17/26
[52] U.S. Cl. ........................ 396/284; 396/285; 396/515; 396/516; 396/538
[58] Field of Search .................... 396/281, 284, 396/285, 389, 512, 515, 516, 535, 538

[56] References Cited

U.S. PATENT DOCUMENTS

| Re. 32,391 | 4/1987 | Berg | 396/284 X |
|---|---|---|---|
| 3,470,799 | 10/1969 | Engelsmann et al. | 396/207 |
| 3,601,024 | 8/1971 | Pagel | 396/209 |
| 3,765,313 | 10/1973 | Faris et al. | 396/380 |
| 4,077,041 | 2/1978 | Imura | 396/207 |
| 4,334,753 | 6/1982 | Harvey | 396/284 X |
| 4,994,828 | 2/1991 | Smart | 396/284 |
| 5,047,794 | 9/1991 | Pagano et al. | 396/514 |
| 5,296,887 | 3/1994 | Zander | 396/512 X |
| 5,625,432 | 4/1997 | Omi | 396/284 |
| 5,654,788 | 8/1997 | Kuhn, Jr. | 396/284 |

*Primary Examiner*—Safet Metjahic
*Assistant Examiner*—J. K. Han
*Attorney, Agent, or Firm*—Peyton C. Watkins

[57] ABSTRACT

A camera for use with a film cartridge having a retractable lip portion that is retracted upon exposure of film in the cartridge, and that is fully extended before exposure of the film, the camera comprises a camera body for forming a protective enclosure. A double exposure hook is disposed in the camera body that latches onto a recess in the retractable lip portion when the film is exposed upon insertion of the cartridge into the camera body for preventing double exposure of the film, and that is forced outwardly upon insertion of the film cartridge when the film is not exposed for permitting the cartridge to be fully inserted. A movable element includes a first position that obstructs viewing through a viewfinder when the cartridge is not inserted, and that is moved to a second position by the double exposure hook upon insertion of the cartridge for permitting viewing through a viewfinder.

11 Claims, 9 Drawing Sheets

PHOTOGRAPHIC CAMERA HAVING A DOUBLE EXPOSURE PROTECTION DEVICE COMBINED WITH A FILM CARTRIDGE INDICATOR

FIELD OF THE INVENTION

The invention relates generally to the field of photographic cameras, and more particularly, to a dual-purpose apparatus in such cameras that functions as both a double exposure protection device and an indicator for indicating the presence or absence of a film cartridge.

BACKGROUND OF THE INVENTION

In thrust type 35 mm film manufacturers' cassettes, such as those manufactured by Eastman Kodak Co. and Fuji Film Photo Ltd., a leading portion of a film strip is thrust from the confines of a loaded film cassette onto a take-up spool rather than having to manually extract the protruding leading portion, as is common to other conventional non-thrusting film cassettes. This is particularly advantageous in that a protruding portion of the film is not required and that a user does not have to take the time to manually extend the leading portion of the film for cinching to a take-up spool prior to image capture.

In commonly assigned U.S. Pat. No. 4,994,828, there is described an apparatus for preventing an exposed film thrusting cartridge from being loaded into a film chamber of the camera. A blocking member with an engageable end is biased by a leaf spring into the film loading chamber of a camera featuring drop-in loading. The blocking member cooperates with a status indicator of the film cartridge to prevent the cartridge from being loaded in the film chamber if the cartridge contains either exposed or partially exposed film. If the film cartridge, however, contains fresh film, or in cameras having MRI logic partially exposed film, the blocking member is pivoted out of the chamber and the cartridge can be loaded.

Another advantage realized using thrust type film cassettes is that a partially exposed film can be rewound into the cassette, and be extracted from the confines of the camera. The cassette can then be reloaded into a camera having a particular logic for allowing the film strip to be thrust and properly advanced to the next exposable frame prior to image capture. The features of rewinding a partially exposed film back into the cartridge and for subsequent exposure of the previously unexposed film is referred to as mid-roll interrupt (MRI).

In commonly assigned and concurrently filed U.S. Ser. No. 08/386,792, filed by J. David Cocca, Paul L. Taillie, and Beth A. O'Leary, a cartridge sensing element is separately provided adjacent the blocking member to prevent the double exposure of a loaded film cartridge after the film contained therein has been either partially or fully exposed and then rewound into the cartridge.

In a preferred embodiment, the cartridge sensing element is a resettable electrical switch which is biased in a first position by another leaf spring that cooperates with the blocking member so that when urged out of the chamber by an unblocked cassette, a portion of the blocking member opens the switch, breaking an electrical connection with a contact surface. The opening of the switch is sensed by a controller which enables a film advancing means to load film from the unblocked cassette and prevents the film from being reloaded until the switch undergoes another close to open transition.

Although the presently known and utilized systems for double exposure are satisfactory, it is always desirable to combine the double exposure feature with other camera features for simplicity and efficiency. In this regard, it is desirable to combine the double exposure feature with a film cartridge indicator.

Consequently, a need exists for a camera overcoming the above-described drawbacks.

SUMMARY OF THE INVENTION

The present invention is directed to overcoming one or more of the problems set forth above. Briefly summarized, according to one aspect of the present invention, the invention resides in a camera for use with a camera cartridge having a retractable lip portion that is retracted upon exposure of film in the cartridge, and that is fully extended before exposure of the film, the camera comprising: (a) a camera body for forming a protective enclosure; (b) a double exposure hook disposed in said camera body that latches onto a recess in the retractable lip portion when the film is exposed upon insertion of the cartridge into said camera body for preventing double exposure of the film, and that is forced outwardly upon insertion of the film cartridge when the film is not exposed for permitting the cartridge to be fully inserted; (c) a movable element having a first position that obstructs viewing through a viewfinder when the cartridge is not inserted, and that is moved to a second position by said double exposure hook upon insertion of the cartridge for permitting viewing through a viewfinder.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of having the double exposure protection device combined with film cartridge indicators. The present invention also includes the advantage of having substantially all mechanical devices.

DETAILED DESCRIPTION OF THE INVENTION

The invention is disclosed as being embodied preferably in a still photographic camera. Because the features of this type of camera are generally well known, the description which follows is directed in particular to elements forming part of or cooperating directly with the disclosed embodiment. It is to be understood, however, that other elements not specifically shown or described may take various forms known to persons ordinarily skilled in the art.

Figure 1:
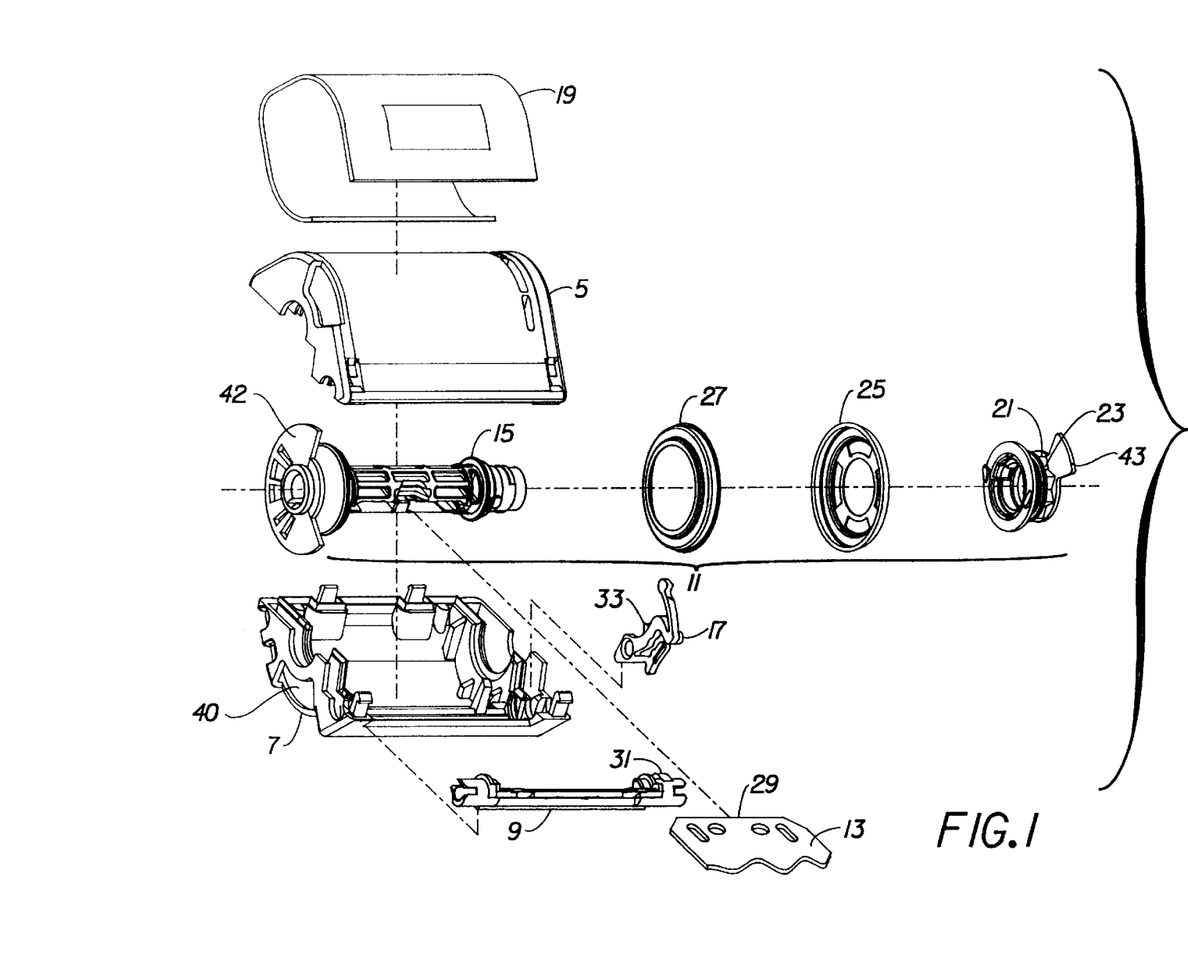
FIG. 1 is an exploded perspective view of a film cassette according to preferred embodiment of the present invention.

Referring now to the drawings, FIG. 1 is an exploded perspective view of a film cassette or film cartridge 1 in accordance with a preferred embodiment of the invention. Generally, the film cassette 1 comprises a cassette shell 3, FIG. 2, constructed of carbon-black plastic material and made up of two mating shell halves 5 and 7, a similarly constructed light shielding door 9 closed to prevent ambient light from entering the cassette interior through a film ingress/egress slot located between the two shell halves and opened to permit film movement into and out of the cassette interior via the film ingress/egress slot, a film spool 11, FIG. 2, supported for rotation inside the cassette shell in opposite film unwinding and winding directions to unwind a filmstrip 13 off a spool core 15 and to wind the filmstrip 13 onto the spool core, a spool lock 17 for engaging the spool core to prevent rotation of the film spool and out of engagement to release the film spool, and a cassette covering label 19.

Figure 5:
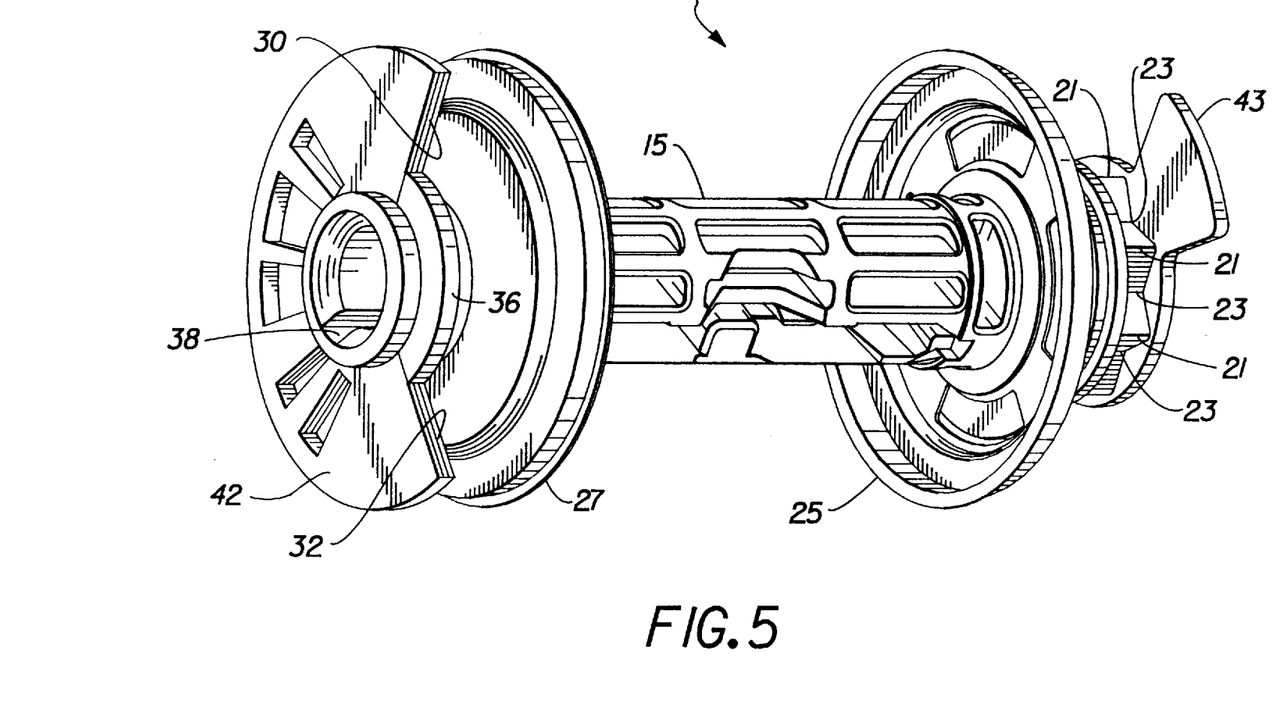
FIG. 5 is an assembled perspective view of the film spool of the film cassette.
Figure 6:
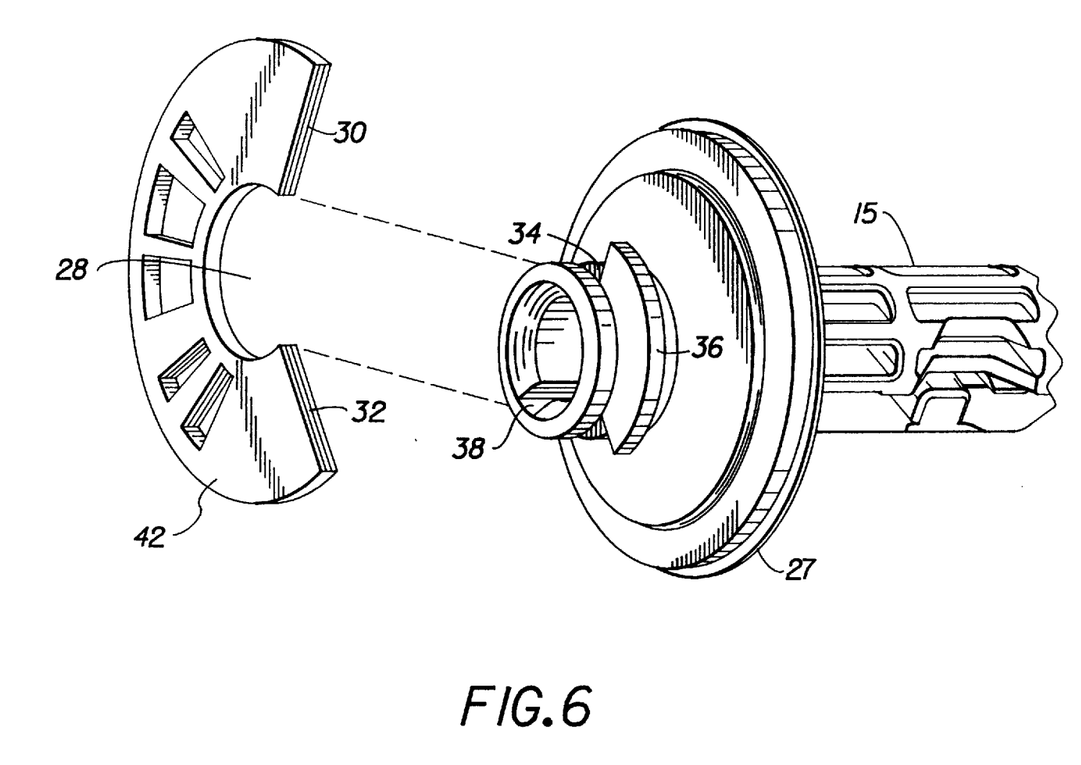
FIG. 6 is an exploded view of one end of the film spool of the film cassette.

The spool core 15, as shown in FIGS. 1 and 5, has a toothed periphery consisting of successive symmetrical teeth 21 separated by interdental spaces 23, and the spool core also supports a pair of coaxial flanged disks 25 and 27 between which the filmstrip is stored in roll form. A trailing or inner end 29 of the filmstrip 13 is attached to the spool core 15.

Figure 2:
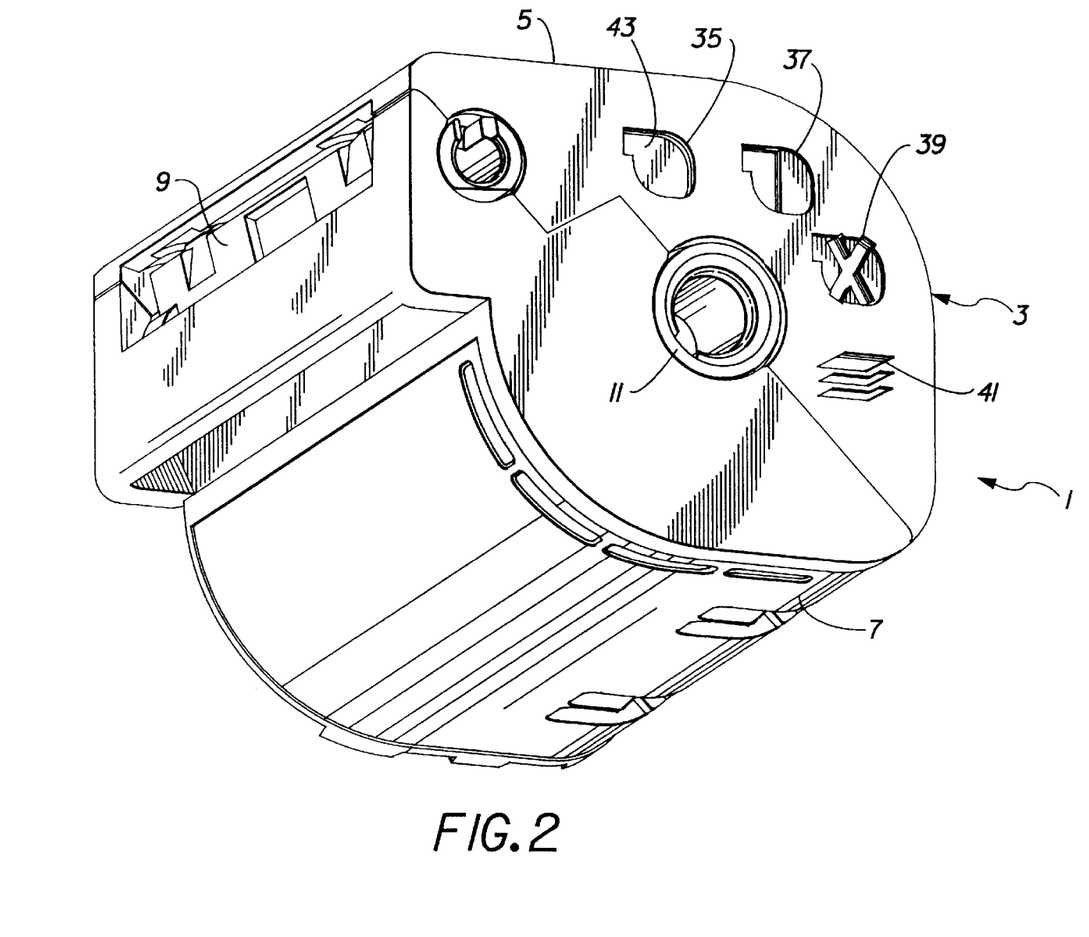
FIG. 2 is an assembled perspective view of the film cassette as seen from one end of the cassette shell.
Figure 3:
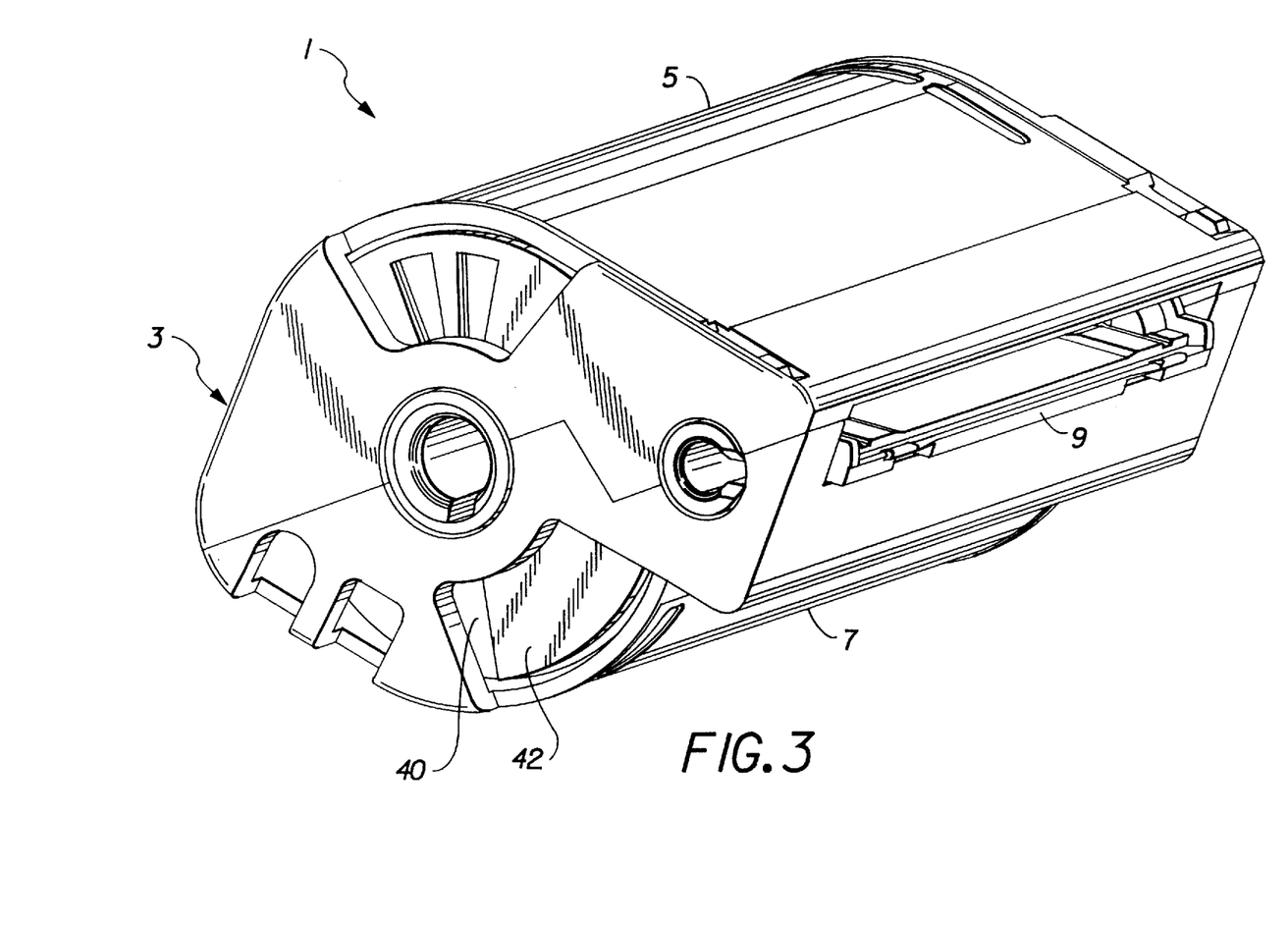
FIG. 3 is an assembled perspective view of the film cassette as seen from the remaining end of the cassette shell.
Figure 4:
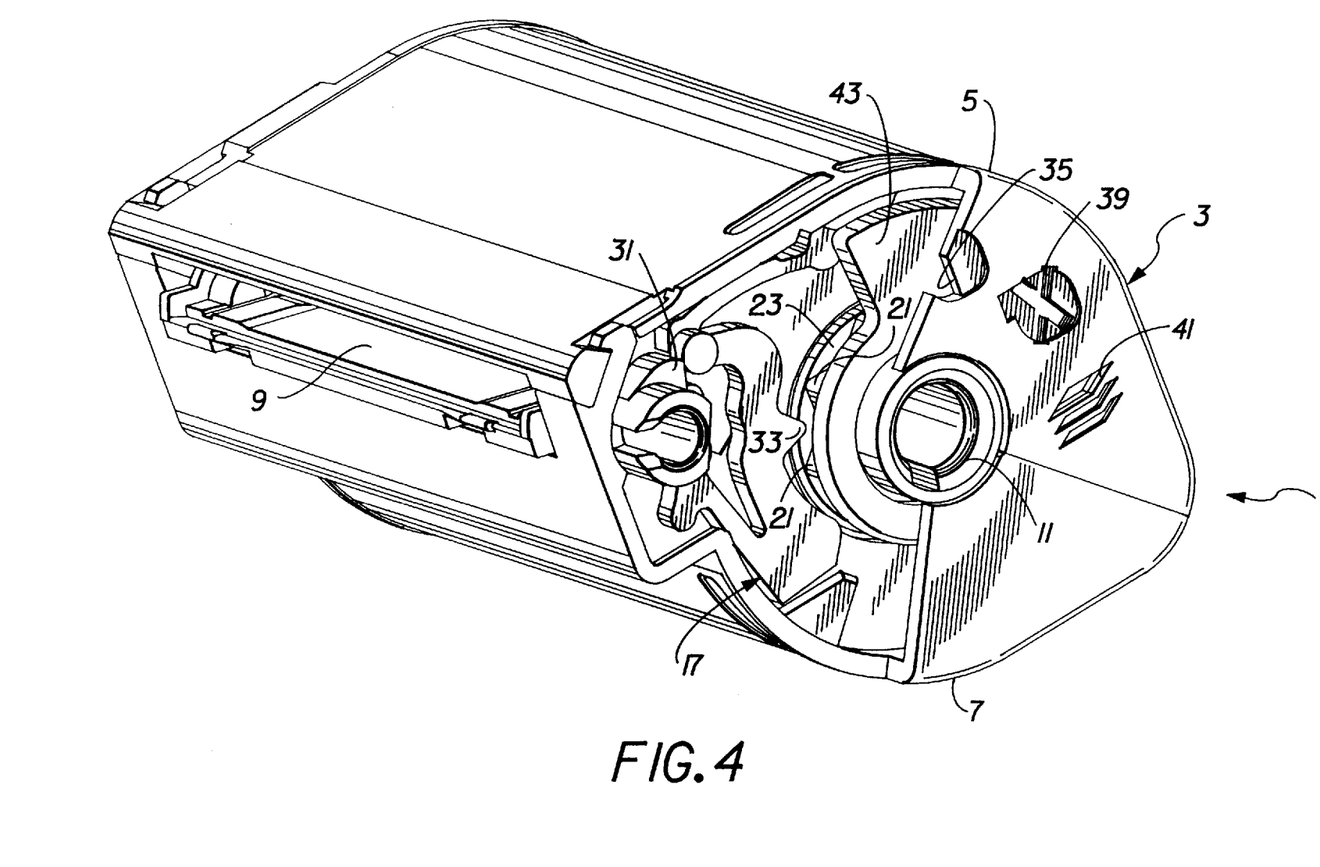
FIG. 4 is an assembled view of the film cassette depicted with part of the cassette shell cutaway to show a spool lock.

The light shielding door 9 as shown in FIGS. 2–4 includes integral cam means 31 for pivoting the spool lock 17 in a locking position as the door is closed. When the spool lock 17 is in its locked position, not shown, an integral detent 33 of the spool lock is located in anyone of the interdental spaces between two adjacent teeth 21 of the spool core 17 in any one of a number of rotational orientations equal to the number of interdental spaces. If the light-shielding door 9 is opened as shown in FIG. 4, its cam means 31 is retracted from the spool lock 17. As a result, forcible rotation of the film spool 11 in the filmwinding or unwinding direction will cause one of the two adjacent teeth 21 between which the detent 33 is located to eject the detent from the interdental space 23 separating those two teeth. Thus, the spool lock 17 will be pivoted out of its locking position.

The shell half 5 at one of its ends has hour icons in the form of respective cutouts 35, 37, 39, and 41 shown in FIG. 2. The cutout 35 is designed to effect an indication that the filmstrip 13 is fresh or unexposed. The cutout 37 is designed to effect an indicating that the filmstrip 13 is partly exposed (and partly unexposed). The cutout 39 is designed to effect an indication that the filmstrip 13 is fully exposed. The cutout 41 is designed to effect an indication that the filmstrip 13 has been processed in a film processing machine to develop the latent images on the exposed film.

An indicator flag 43 is coaxially fixed to the spool core 15 at the remaining end of the spool opposite to the indicating status end of the cassette as shown in FIGS. 1 and 5, to be rotated with the film spool 11 in the film unwinding and film winding directions. Initially, the flag 43 is secured with the film spool 11 in a rotational orientation that locates the flag immediately beneath the cutout 35 as shown in FIG. 2, to provide an indication that the filmstrip is fresh or unexposed. Conversely, when the flag 43 is secured with the film spool 11 in a rotational orientation that locates the flag immediately beneath the cutout 37, it is visible to provide an indication that the filmstrip 13 is partly exposed (and partly unexposed). When the flag 43 is secured with the film spool 11 in a rotational orientation that locates the flag immediately beneath the cutout 39, it is visible to provide an indication that the filmstrip is fully exposed. When the flag 43 is secured with the film spool 11 in a rotational orientation that locates the flag immediately beneath the cutout 41, it is visible to provide an indication that the filmstrip 13 has been processed.

The film spool 11, as shown in FIGS. 1, 3, 5 and 6 includes a plastic disk 42 having a semi-circular configuration; that is, "c" shaped, including a central opening 28, and a pair of extreme ends 30 and 32. The spool core longitudinally extends through the central opening 28 of the disk 42 and has a peripheral groove 34 in which the disk is seated to secure the disk and the spool core coaxially together. A registration stop 36 is fixed to the spool core 15 adjacent the peripheral groove 34 and has a pair of stop ends arranged to abut the extreme ends 30 and 32 of the disk to critically orient the disk with respect to a key slot 38 of the spool core.

A window 40 provided in the shell half 7, FIG. 1 is intended to provide status indication of the film 13 contained in the cassette 1 in cooperation with the disk 42, the spool core 11 and the indicator flag 43. When the disk 42 covers the entirety of the window 40, FIG. 2, the film contained within the cassette 1 is wholly unexposed. When a portion (approximately one half) of the window 40 is covered by the disk 42, there is partly exposed film contained in the cassette, corresponding to the indicator flag 43 being present in the cutout 37. Finally, when all of the film in the cassette is exposed, the disk 42 is not visible within the window 40. Additional details regarding the described cassette are found in commonly assigned U.S. Pat. No. 5,296,887 issued to Zander, which is hereby incorporated by reference.

Figure 7:
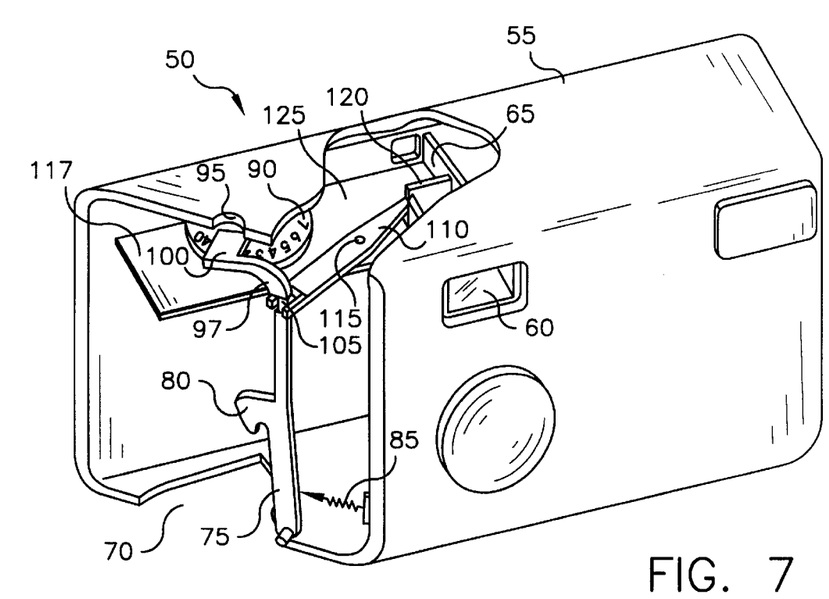
FIG. 7 is a perspective view of a camera of the present invention with a portion deleted for clarity.
Figure 8:
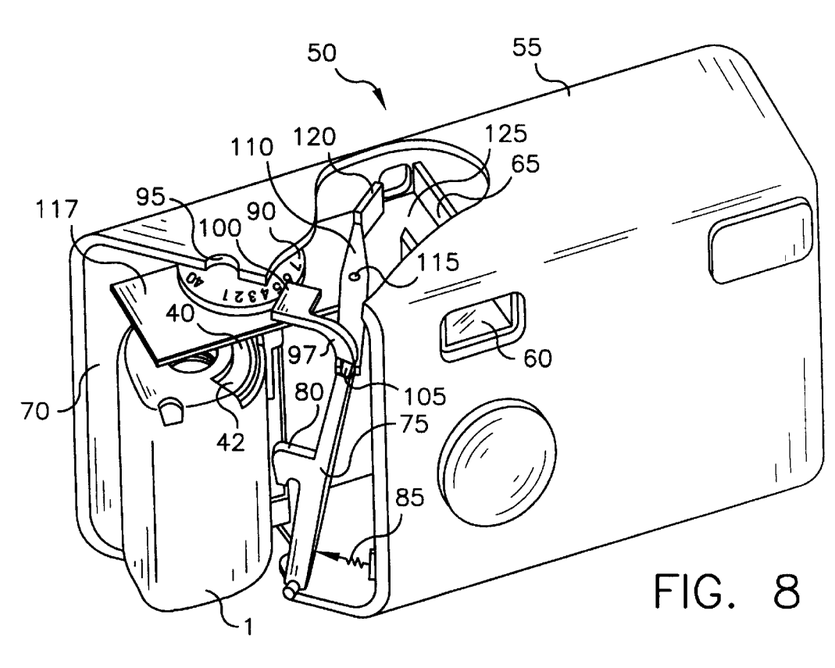
FIG. 8 is also a perspective view of a camera of the present invention with a portion deleted for clarity illustrating insertion of a film cartridge.

Referring to FIGS. 7 and 8, there is illustrated a still camera 50 having a camera housing 55 for forming a closed enclosure. The camera housing 55 includes a viewfinder 60 disposed therethrough through which a user looks for viewing the image to be captured. The viewfinder 60 includes a U-shaped wall 65 that forms an optical pathway for projecting the incident image through the optical pathway. The viewfinder 60 also includes an outwardly extending extension, or plate, 117 for providing structural support for other elements, as will be described hereinbelow. The camera housing 55 also includes a cartridge chamber 70 for receiving the film cartridge 1. A double exposure protection arm 75, which is pivotably attached to the camera housing 55 at one end, prevents the re-insertion of an already exposed film cartridge in one of its two functions. The arm 75 includes an outwardly extending, arcuate-shaped depression hook 80 which latches onto the opening formed by the window 40 when the disk 42 is not positioned therein. It is instructive to note that the disk 42 is not positioned in the window 40 when the film in the cartridge 1 is exposed. If the disk 42 is positioned in the window 40 (i.e., the film in the cartridge is not exposed), the film cartridge 1 is obviously permitted to pass by the depression hook 80 for ultimately permitting the film cartridge I to be fully inserted into the chamber 70, as illustrated in FIG. 8.

A spring 85 is attached to the camera housing 55 for biasing the arm 75 into the chamber 70. When an unexposed film cartridge 1 is inserted into the chamber 70, the cartridge 1 presses against the depressed hook 80, and consequently, forces the arm 75 out of the chamber 70; the spring 85 is obviously compressed by this force for permitting the film cartridge 1 to enter the chamber 70. When the film cartridge I is unloaded out of the chamber 70, the spring 85 is returned to its original bias position.

A counter 90 is attached to the plate 117 and includes numbers thereon for indicating the number of exposed film frames of the film in the cartridge 1. A counter window 95 is also positioned at the top portion of the camera housing for permitting the user to view the number from the camera exterior. The details of the film counter 90 are well known in the art and are not discussed in detail herein.

The arm 75 further includes an arcuate-shaped neck portion 97 that is attached to the arm 75 via a pin 105. The neck portion 97 includes a blocking element 100 that protrudes upwardly and over the film counter 90 when there isn't a film cartridge 1 in the chamber 70 for indicating the absence of a film cartridge, and extends outwardly and away from the counter 90 when a film cartridge 1 is in the chamber for permitting the counter to be viewed through the counter window.

A pivotable viewfinder flag 110 is attached to the arm 75 via the pin 105 for also indicating the presence or absence of film, as will later become readily apparent. In this regard, a pin 115 is attached to the plate 117 for permitting the viewfinder flag 110 to pivot thereabout. The viewfinder flag 110 includes a rigidly attached blocking operator 120 that protrudes through a notched-out portion 125 of the viewfinder wall 65 and into the optical pathway of the viewfinder 60 when a film cartridge 1 is not in the chamber 70. As will be apparent to those skilled in the art, when the arm 75 is biased into the cartridge chamber 70, the viewfinder flag 110 positions the blocking operator 120 into the optical pathway of the viewfinder 60 for blocking any images from being seen through the viewfinder 60. When a film cartridge 1 is inserted into the cartridge chamber 70, the viewfinder flag 110 pivots about the pin 115 and pulls the blocking operator 120 out of the optical pathway of the viewfinder 60. This unobstructed view of the incident image indicates to the user that a film cartridge 1 is in the cartridge chamber.

Figure 9:
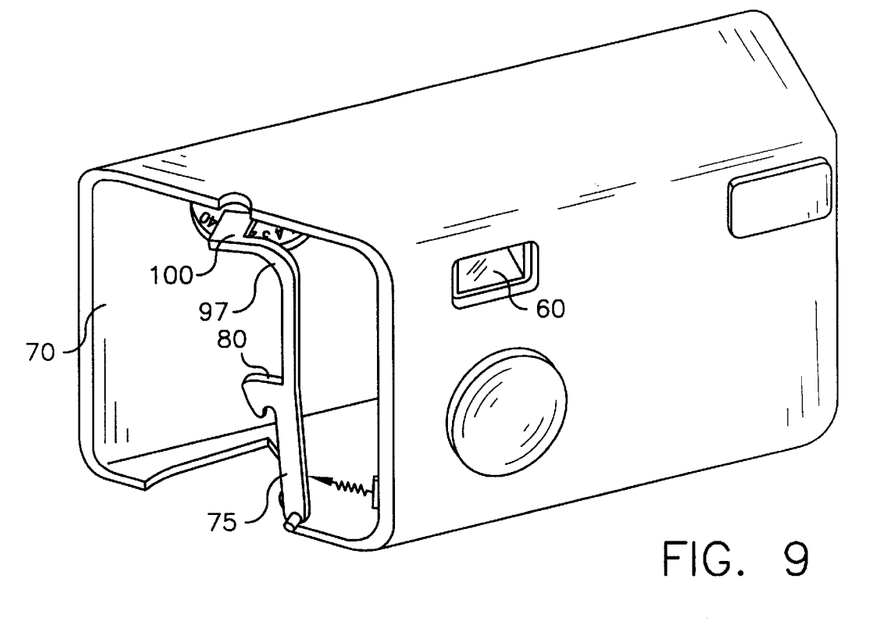
FIGS. 9 and 10 are perspective views of an alternative embodiment of FIGS. 7 and 8.
Figure 10:
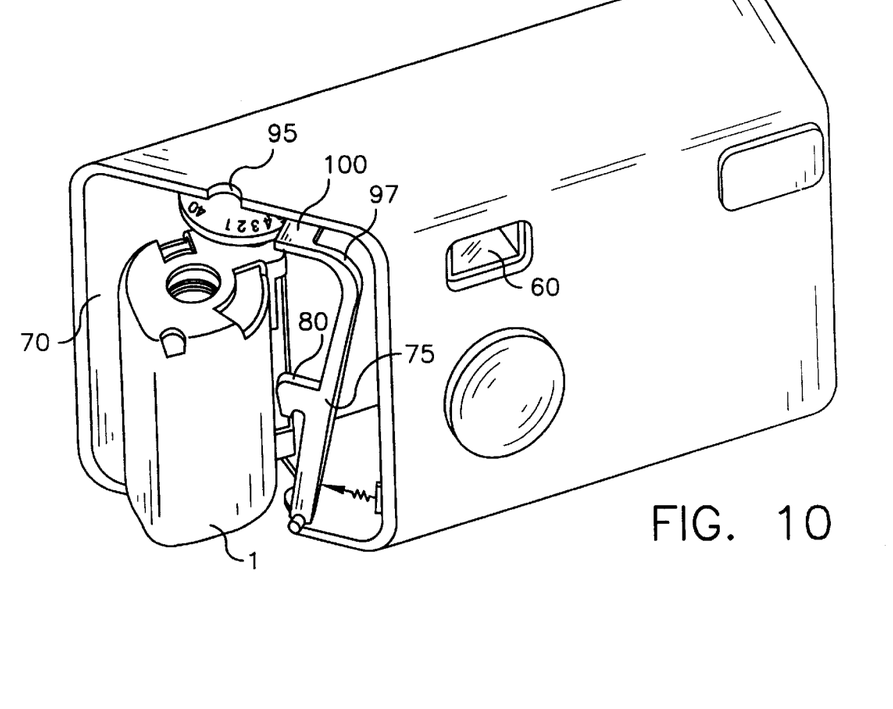

Referring now to FIGS. 9 and 10, an alternative embodiment of the present invention is illustrated that illustrates that the two above-described indicator devices may be distinctly and separately operated in connection with the arm 75. In this regard, the blocking element 100 is shown without the viewfinder flag 110 of FIGS. 7 and 8. In this embodiment, the neck portion 97 is connected directly to the arm 75. The operation is the same as that described above except that optical pathway is not blocked.

Figure 11:
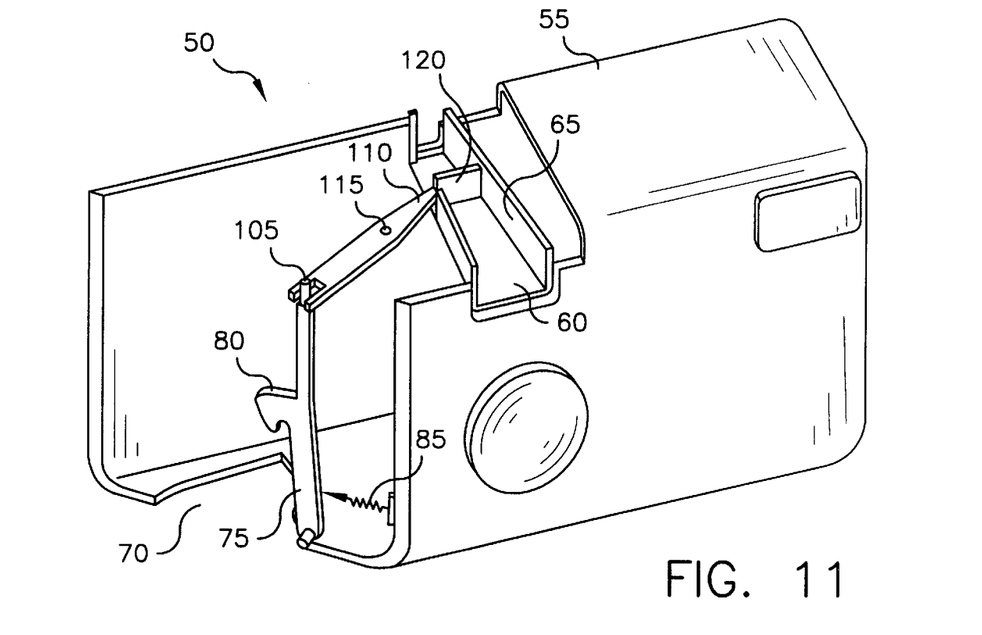
FIGS. 11 and 12 are also perspective views of an alternative embodiment of FIGS. 7 and 8.
Figure 12:
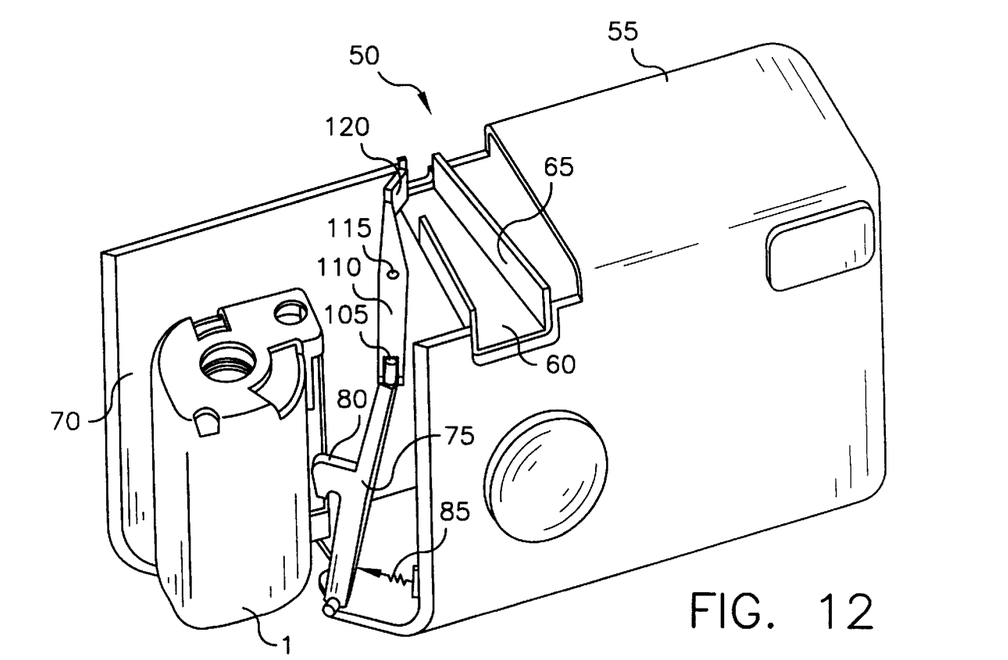

In still another alternative embodiment, and referring to FIGS. 11 and 12, the viewfinder flag 110 and blocking operator 120 is shown without the blocking element 100 of FIGS. 7 and 8. In this case, the operation is the same as that described above for the whole assembly except that the counter 90 (not shown in FIGS. 10 and 11) is not blocked when a film cartridge 1 is in the cartridge chamber 70.

The invention has been described with reference to a preferred embodiment. However, it will be appreciated that variations and modifications can be effected by a person of ordinary skill in the art without departing from the scope of the invention.

Parts List 1 film cartridge or film cassette
3 cassette shell
5 mating shell halves
7 mating shell halves
9 light shielding door
11 film spool
13 filmstrip
15 spool core
17 spool lock
19 cassette covering label
21 symmetrical teeth
23 interdental spaces
25 coaxial flanged disks
27 coaxial flanged disks
28 central opening
29 trailer or inner end
30 extreme ends
31 integral cam means
32 extreme ends
33 integral detent
34 peripheral groove
35 cutouts
36 registration stop
37 cutouts
38 key slot
39 cutouts
40 window
41 cutouts
42 plastic disk
43 indicator flag
50 still camera
55 camera housing
60 viewfinder
65 U-shaped wall
70 cartridge chamber
75 protection arm
80 depression hook
85 spring
90 counter
95 counter window
97 arcuate-shaped neck
105 pin
100 blocking element
110 pivotable viewfinder flag
115 pin
117 plate
120 blocking operator
125 notched-out portion

I claim:

1. A camera for use with a film cartridge having a retractable lip portion that is retracted upon exposure of film in the cartridge, and that is fully extended before exposure of the film, the camera comprising:

(a) a camera body for forming a protective enclosure;
   (b) a double exposure hook disposed in said camera body that latches onto a recess in the retractable lip portion when the film is exposed upon insertion of the cartridge into said camera body for preventing double exposure of the film, and that is forced outwardly upon insertion of the film cartridge when the film is not exposed for permitting the cartridge to be fully inserted;
   (c) a movable element, which is attached to said double exposure hook, having a first position that obstructs viewing through a viewfinder when the cartridge is not inserted, and that is moved to a second position by said double exposure hook upon insertion of the cartridge for permitting viewing through a viewfinder for indicating the presence of the film cartridge.

2. The camera as in claim 1 further comprising a pivotable lever that is attached both to said double exposure hook and to said movable element for permitting unison movement of said element and said double exposure hook.

3. The camera as in claim 1 further comprising a flag attached to said double exposure hook that prevents a counter from being viewed when the cartridge is not inserted, and for permitting the counter to be viewed when the cartridge is inserted.

4. The camera as in claim 1 further comprising a spring disposed in said camera body for biasing said double exposure hook outwardly.

5. The camera as in claim 1, wherein said double exposure hook includes an elongated stem from which extends an arcuate-shaped hook that latches to the recess of the lip portion when said recess is exposed.

6. The camera as in claim 4 further comprising a pivot pin positioned in said camera body and attached to said double exposure hook for permitting pivoting of said double exposure hook.

7. A camera for use with a film cartridge having a retractable lip portion that is retracted upon exposure of film in the cartridge, and that is fully extended before exposure of the film, the camera comprising:

(a) a camera body for forming a protective enclosure;

(b) a double exposure hook disposed in said camera body that latches onto a recess in the retractable lip portion when the film is exposed upon insertion of the cartridge into said camera body for preventing double exposure of the film, and that is forced outwardly upon insertion of the film cartridge when the film is not exposed for permitting the cartridge to be fully inserted;

(c) a movable element, which is attached to said double exposure hook, having a first position that obstructs viewing through a film-frame counter window when the cartridge is not inserted, and that is moved to a second position by said double exposure hook upon insertion of the cartridge for permitting viewing through the counter window for indicating the presence of the film cartridge.

8. The camera as in claim 7 further comprising a viewfinder flag, that is attached to said double exposure hook, having a first position that obstructs viewing through a viewfinder when the cartridge is not inserted, and that is moved to a second position by said double exposure hook upon insertion of the cartridge for permitting viewing through a viewfinder for indicating the presence of the film cartridge.

9. The camera as in claim 8 further comprising a pivotable lever that is attached both to said double exposure hook and to said viewfinder flag for permitting unison movement of said viewfinder flag and said double exposure hook.

10. The camera as in claim 7 further comprising a spring disposed in said camera body for biasing said double exposure hook outwardly.

11. The camera as in claim 7, wherein said double exposure hook includes an elongated stem from which extends an arcuate-shaped hook that latches to the recess of the lip portion when said recess is exposed.

* * * * *